(12) United States Patent
Demidov et al.

(10) Patent No.: US 7,463,411 B2
(45) Date of Patent: Dec. 9, 2008

(54) OPTICAL FIBER AMPLIFIER

(76) Inventors: Andrey A. Demidov, 1110 Franklin St., Duxbury, MA (US) 02332; Andrei N. Starodoumov, 293 Turnpike Rd., Westborough, MA (US) 01581

( * ) Notice: Subject to any disclaimer, the term of this patent is extended or adjusted under 35 U.S.C. 154(b) by 0 days.

(21) Appl. No.: 10/771,002

(22) Filed: Feb. 3, 2004

(65) Prior Publication Data
US 2004/0240043 A1 Dec. 2, 2004

Related U.S. Application Data

(63) Continuation-in-part of application No. PCT/US02/24409, filed on Aug. 1, 2002.

(60) Provisional application No. 60/310,195, filed on Aug. 3, 2001.

(51) Int. Cl.
*H04B 10/17* (2006.01)

(52) U.S. Cl. ................ 359/334; 359/341.1

(58) Field of Classification Search ............ 359/334, 359/341.1
See application file for complete search history.

(56) References Cited

U.S. PATENT DOCUMENTS

| | | | |
|---|---|---|---|
| 4,063,106 A | 12/1977 | Ashkin et al. | |
| 4,616,898 A | 10/1986 | Hicks, Jr. | |
| 4,699,452 A | 10/1987 | Mollenauer et al. | |
| 4,794,598 A | 12/1988 | Desurvire et al. | |
| 4,829,528 A * | 5/1989 | Band et al. | 372/3 |
| 4,852,117 A * | 7/1989 | Po | 372/97 |
| 4,881,790 A | 11/1989 | Mollenauer | |
| 5,050,183 A * | 9/1991 | Duling, III | 372/94 |
| 5,225,925 A | 7/1993 | Grubb et al. | |
| 5,323,404 A | 6/1994 | Grubb | |
| 5,406,411 A | 4/1995 | Button et al. | |
| 5,497,386 A * | 3/1996 | Fontana | 372/18 |

(Continued)

FOREIGN PATENT DOCUMENTS

EP 0 954 072 A1 11/1999

(Continued)

OTHER PUBLICATIONS

Chang et al.; "Cascaded Raman fibre laser for stable dual-wavelength operation"; Electronics Letters Jun. 7, 2001, vol. 37, No. 12, p. 740-741.

(Continued)

*Primary Examiner*—Jack W Keith
*Assistant Examiner*—Ari M Diacou
(74) *Attorney, Agent, or Firm*—Peter J. Rainville

(57) ABSTRACT

A fiber amplifier for amplifying an optical signal, comprising a pump energy source capable of emitting energy at a pump wavelength: optical apparatus for transmitting the optical signal, the optical apparatus having a plurality of discrete portions, each discrete portion comprising a length of optical fiber and first and second components disposed at first and second respective locations and configured to substantially prevent energy having an intermediate wavelength in the discrete portion from entering other discrete portions of the optical apparatus; and a plurality of waveguides, each waveguide coupled to the pump energy source and to one of the plurality of discrete portions, each waveguide for providing energy at the pump wavelength from the pump energy source to its corresponding discrete portion, thereby increasing an intensity of light at the discrete portion's intermediate wavelength.

56 Claims, 4 Drawing Sheets

U.S. PATENT DOCUMENTS

| | | | |
|---|---|---|---|
| 5,537,671 A * | 7/1996 | Toyama et al. | 385/27 |
| 5,623,508 A * | 4/1997 | Grubb et al. | 372/3 |
| 5,659,644 A | 8/1997 | DiGiovanni et al. | |
| 5,673,280 A | 9/1997 | Grubb et al. | |
| 5,721,636 A | 2/1998 | Erdogan et al. | |
| 5,778,014 A | 7/1998 | Islam | |
| 5,815,518 A | 9/1998 | Reed et al. | |
| 5,838,700 A | 11/1998 | Dianov et al. | |
| 5,898,716 A * | 4/1999 | Ahn et al. | 372/6 |
| 5,959,750 A | 9/1999 | Eskildsen et al. | |
| 5,966,480 A | 10/1999 | LeGrange et al. | |
| H1813 H * | 11/1999 | Kersey | 372/94 |
| 5,982,791 A | 11/1999 | Sorin et al. | |
| 5,991,068 A * | 11/1999 | Massicott et al. | 359/337 |
| 5,999,545 A * | 12/1999 | Jeon et al. | 372/6 |
| 6,052,393 A | 4/2000 | Islam | |
| 6,081,366 A | 6/2000 | Kidorf et al. | |
| 6,088,152 A | 7/2000 | Berger et al. | |
| 6,147,794 A | 11/2000 | Stentz | |
| 6,151,160 A | 11/2000 | Ma et al. | |
| 6,163,396 A * | 12/2000 | Webb | 359/332 |
| 6,163,552 A | 12/2000 | Engelberth et al. | |
| 6,163,554 A | 12/2000 | Chang et al. | |
| 6,163,636 A | 12/2000 | Stentz et al. | |
| 6,181,464 B1 | 1/2001 | Kidorf et al. | |
| 6,191,877 B1 | 2/2001 | Chraplyvy et al. | |
| 6,292,288 B1 | 9/2001 | Akasaka et al. | |
| 6,298,074 B1 * | 10/2001 | Jeon et al. | 372/18 |
| 6,304,368 B1 * | 10/2001 | Hansen et al. | 359/334 |
| 6,310,899 B1 | 10/2001 | Jacobovitz-Veselka et al. | |
| 6,344,925 B1 | 2/2002 | Grubb et al. | |
| 6,374,006 B1 | 4/2002 | Islam et al. | |
| 6,407,855 B1 | 6/2002 | MacCormack et al. | |
| 6,424,664 B1 * | 7/2002 | Oh et al. | 372/6 |
| 6,426,965 B1 | 7/2002 | Chang et al. | |
| 6,433,920 B1 | 8/2002 | Welch et al. | |
| 6,449,408 B1 * | 9/2002 | Evans et al. | 385/27 |
| 6,549,329 B2 | 4/2003 | Vail et al. | |
| 6,594,288 B1 | 7/2003 | Putnam et al. | |
| 6,603,593 B2 | 8/2003 | Fidric et al. | |
| 6,603,595 B2 | 8/2003 | Welch et al. | |
| 6,606,337 B1 | 8/2003 | King | |
| 6,621,835 B1 | 9/2003 | Fidric | |
| 6,646,785 B2 * | 11/2003 | Kuksenkov | 359/334 |
| 6,700,696 B2 | 3/2004 | Dominic et al. | |
| 6,721,088 B2 * | 4/2004 | Brar et al. | 359/334 |
| 6,731,423 B1 * | 5/2004 | Brasseur et al. | 359/334 |
| 6,959,021 B2 * | 10/2005 | Po et al. | 372/6 |
| 7,277,610 B2 * | 10/2007 | Demidov et al. | 385/37 |
| 2001/0030796 A1 * | 10/2001 | Yao | 359/334 |
| 2002/0001125 A1 | 1/2002 | Chang et al. | |
| 2002/0003655 A1 * | 1/2002 | Park et al. | 359/341.1 |
| 2002/0024722 A1 | 2/2002 | Tsuzaki et al. | |
| 2002/0063947 A1 * | 5/2002 | Islam | 359/334 |
| 2002/0118709 A1 * | 8/2002 | Islam | 372/3 |
| 2002/0126714 A1 | 9/2002 | Po et al. | |
| 2002/0154661 A1 * | 10/2002 | Hoose et al. | 372/6 |
| 2002/0191277 A1 | 12/2002 | Chen et al. | |
| 2003/0011876 A1 * | 1/2003 | Fidric | 359/337.4 |
| 2003/0016438 A1 * | 1/2003 | Islam | 359/334 |
| 2003/0021302 A1 * | 1/2003 | Grudinin et al. | 372/6 |
| 2003/0076577 A1 | 4/2003 | Dominic et al. | |
| 2004/0130777 A1 * | 7/2004 | Islam | 359/334 |
| 2004/0179797 A1 * | 9/2004 | Po et al. | 385/123 |

FOREIGN PATENT DOCUMENTS

| | | |
|---|---|---|
| EP | 0 954 072 B1 | 4/2000 |
| EP | 1 018 666 A1 | 7/2000 |
| EP | 1 124 295 A2 | 8/2001 |
| EP | 1 225 666 A2 | 7/2002 |
| EP | 1 257 023 A2 | 11/2002 |
| EP | 1 309 113 A2 | 5/2003 |
| JP | 58121694 | 7/1983 |
| JP | 59165488 | 9/1984 |
| JP | 63202085 | 8/1988 |
| JP | 1196189 | 8/1989 |
| WO | WO 96/37936 | 11/1996 |
| WO | WO 99/50941 | 10/1999 |
| WO | WO99/66607 | 12/1999 |
| WO | WO 01/33285 A2 | 5/2001 |
| WO | WO 01/33285 A3 | 5/2001 |
| WO | WO01/52372 A1 | 7/2001 |
| WO | WO 02/063728 A2 | 8/2002 |
| WO | WO 02/093704 A1 | 11/2002 |
| WO | WO 03/005068 A2 | 1/2003 |
| WO | WO 03/005068 A3 | 1/2003 |
| WO | WO 02/063728 A3 | 3/2003 |
| WO | WO 02/063728 A3 | 5/2003 |
| WO | WO 03/014771 A3 | 8/2004 |

OTHER PUBLICATIONS

Chang et al.; "Dual-wavelength cascaded Raman fibre laser"; Electronics Letters Aug. 3, 2000, vol. 36, No. 16, p. 1356-1358.

Chang et al.; "Cascaded Raman fibre laser operating at 1.48um"; Electronics Letters Oct. 28, 1999, vol. 35, No. 22, p. 1951-1952.

Chernikov et al.; "Raman fibre laser operating at 1.24um"; Electronics Letters Apr. 2, 1998, vol. 34, No. 7, p. 680-681.

Persephonis et al.; "Cascaded CW fibre Raman laser source 1.6-1.9um"; Electronics Letters Aug. 1, 1996, vol. 32, No. 16, p. 1486-1487.

Chernikov et al.; "High-gain, monolithic, cascaded fibre Raman amplifier operating at 1.3um"; Electronics Letters Mar. 16, 1995, vol. 31, No. 6, p. 472-473.

Stentz et al.; "Figure-eight fibre laser with largely unbalanced central coupler"; Electronics Letters Aug. 4, 1994, vol. 30, No. 16, p. 1302-1303.

Demidov et al.; "Three-wavelength Raman fiber laser with reliable dynamic control"; Optics Letters, vol. 28, No. 17, Sep. 1, 2003, p. 1540-1542.

Dianov et al.; "Three-cascaded 1407-nm Raman laser based on phosphorus-doped silica fiber"; Optics Letters, vol. 25, No. 6, Mar. 15, 2000, p. 402-404.

Stentz et al.; "Polarization effects and nonlinear switching in fiber figure-eight lasers"; Optics Letters, vol. 19, No. 18, Sep. 15, 1994, p. 1462-1464.

Lewis et al.; "Fibre-optic tunable CW Raman laser operating around 1.3um"; Optics Communications 182 (2000) 403-405.

Prabhu et al.; "Simultaneous two-color CW Raman fiber laser with maximum output power of 1.05W / 1239nm and 0.95W / 1484 nm etc."; Optics Communications 182 (2000) 305-309.

Chang et al.; "Efficient cascaded Raman generation and signal amplification at 1.3um in GeO2-doped single-mode fibre"; Optics Communications 142 (1997) 289-293.

Xu et al.; "Output characteristics of a fibre Raman laser with a composite GeO2 and P2O5-doped silica fibre"; Journal of Modern Optics, 2001, vol. 48, No. 7, 1269-1279.

Kidorf et al.; "Pump Interactions in a 100-nm Bandwidth Raman Amplifier"; IEEE Photonics Technology Letters, vol. 11, No. 5, May 1999, p. 530-532.

Jain et al.; "A tunable multiple Stokes cw fiber Raman oscillator"; Applied Physics Letters, vol. 31, No. 2, Jul. 15, 1977, p. 89-90.

Hill et al.; "Low-threshold cw Raman laser"; Applied Physics Letters, vol. 29, No. 3, Aug. 1, 1976, p. 181-183.

Chang et al.; "A novel intra-cavity for efficient cascaded Raman generation using WDM couplers"; OFC 2001, Anaheim; WDD14-1.

Papernyi et al.; "Efficient dual-wavelength Raman fiber laser"; OFC 2001, Technical Digest, WDD15-1.

Mermelstein et al.; "A High-Efficiency Power-Stable Three-Wavelength Configurable Raman Fiber Laser"; OFC 2001, Anaheim, Post Deadline, PD3-1.

Chernikov et al.; "Broadband Raman amplifiers in the spectral range of 1480-1620 nm"; OFC 1999, WG6-1/117.

Demidov et al.; "Optical Fiber and System Containing Same"; U.S. Appl. No. 10/714,524, filed Nov. 14, 2003.

Po et al.; Multi-wavelength Optical Fiber; U.S. Appl. No. 10/735,862, filed Dec. 12, 2003.

EP 02 75 0386 Supplementary European Search Report.

* cited by examiner

OPTICAL FIBER AMPLIFIER

CROSS-REFERENCE TO RELATED APPLICATIONS

This application is a continuation-in-part of International Application No. PCT/US02/24409, which has an international filing date of Aug. 1, 2002, and is entitled "Optical Fiber Amplifier", and which in turn claims priority to U.S. Provisional Patent Application Ser. No. 60/310,195, which was filed Aug. 3, 2001 and is entitled "Multi-Pump Discrete Raman Amplifier". The foregoing applications are incorporated herein by reference.

TECHNICAL FIELD

This invention relates to optical fibers (e.g., fiber lasers and fiber amplifiers), and systems containing such optical fibers. More particularly, the invention is directed toward fiber-based discrete optical amplifiers used in telecommunications, cable television and other fiber-optics applications.

BACKGROUND

In response to rising demand for information processing services, communications service providers have implemented optical communication systems, which have the capability to provide substantially larger information transmission capacities than traditional electrical communication systems. Information can be transported through optical systems in audio, video, data, or other signal format analogous to electrical systems. Likewise, optical systems can be used in telephone, cable television, LAN, WAN, and MAN systems, as well as other communication systems.

The development of the erbium doped fiber optical amplifier (EDFA) provided a cost effective means to optically amplify attenuated optical signal wavelengths in the 1550 nm range. EDFAs have been widely used in communication systems because their bandwidth coincides with the lowest loss window in optical fibers commonly employed in optical communication around 1550 nm. For wavelengths shorter than about 1525 nm, however, erbium atoms in typical glasses will absorb more than amplify. To broaden the gain spectra of EDFAs, various dopants have been added. For example, codoping of the silica core with aluminum or phosphorus can broaden the emission spectrum. Nevertheless, the absorption wavelength for various glasses is still around 1530 nm.

Raman fiber amplifiers offer an alternative to EDFAs.

Certain optical fibers can be used as fiber amplifiers or fiber lasers.

Fiber amplifiers are typically used to amplify an input signal. Often, the input signal and a pump signal are combined and passed through the fiber amplifier to amplify the signal at an input wavelength. The amplified signal at the input wavelength can then be isolated from the signal at undesired wavelengths.

Raman fiber lasers can be used, for example, as energy sources. In general, Raman fiber lasers include a pump source coupled to a fiber, such as an optical fiber, having a gain medium with a Raman active material. Energy emitted from the pump source at a certain wavelength $\lambda_p$, commonly referred to as the pump energy, is coupled into the fiber. As the pump, energy interacts with the Raman active material in the gain medium of the fiber, one or more Raman Stokes transitions can occur within the fiber, resulting in the formation of energy within the fiber at wavelengths corresponding to the Raman Stokes shifts that occur (e.g., $\lambda_1$, $\lambda_2$, $\lambda_3$, $\lambda_4$, etc.).

Generally, the Raman active material in the gain medium of a Raman fiber laser may have a broad Raman gain spectrum. Usually, conversion efficiency varies for different frequencies within the Raman gain spectrum and many Raman active materials exhibit a peak in their gain spectrum, corresponding to the frequency with highest conversion efficiency. Additionally, the gain spectrum for different Raman active materials may be substantially different, partially overlapping, or of different conversion efficiency.

Typically, a Raman fiber Laser is designed so that the energy formed at one or more Raman Stokes shifts is substantially confined within the fiber. This can enhance the formation of energy within the fiber at one or more higher order Raman Stokes shifts. Often, the fiber is also designed so that at least a portion of the energy at wavelengths corresponding to predetermined, higher order Raman Stokes shifts (e.g., $\lambda_{sx}$ where x is equal to or greater than one) is allowed to exit the fiber.

Raman fiber amplifiers can be adapted to amplify a broad range of wavelengths.

SUMMARY

In general, the invention relates to optical fibers (e.g., fiber lasers and fiber amplifiers), and systems containing such optical fibers.

In one aspect, the invention features a fiber amplifier for amplifying an optical signal having a signal wavelength. The fiber amplifier includes an optical fiber for transmitting the optical signal, a pump energy source and a plurality of waveguides. The optical fiber has a plurality of discrete portions. Each discrete portion includes first and second components disposed at first and second respective locations and configured to substantially prevent energy having an intermediate wavelength in the discrete portion from entering other discrete portions of the optical fiber. The pump energy source is capable of emitting energy at a pump wavelength. Each waveguide is coupled to the pump energy source and to one of the plurality of discrete portions of the optical fiber. Each waveguide is configured to direct energy at the pump wavelength from the pump energy source to its corresponding discrete portion, thereby increasing an intensity of light at the discrete portion's intermediate wavelength in the corresponding discrete portion of the optical fiber. In embodiments, the fiber amplifier can be included in a system that also includes a signal source configured to direct the optical signal into the optical fiber, and a signal receiver configured to detect an output optical signal in the optical fiber. The output signal can be, for example, an optical signal that has been amplified by the fiber amplifier.

In another aspect, the invention features a fiber amplifier for amplifying an optical signal having a signal wavelength. The fiber amplifier includes an optical fiber having a plurality of discrete portions. Each discrete portion includes first and second components positioned at first and second respective locations in the discrete portion and configured to substantially prevent light having an intermediate wavelength in the portion from entering other portions of the optical fiber. The fiber amplifier also includes a coupler configured to couple pump energy from a pump energy source into the discrete portion so that the pump energy interacts with the optical fiber to increase the intensity of the intermediate wavelength in each portion.

In a further aspect, the invention features a fiber amplifier that includes an optical fiber having first and second sections coupled to each other. The first section is a double clad fiber laser, and the second section is an optical amplifier having a gain medium including $P_2O_5$. In embodiments, the fiber amplifier can be in a system that includes an input waveguide coupled to the second section of the fiber amplifier, and an output waveguide connected to the first coupler.

In certain embodiments, the fibers can be used as amplifiers rather than lasers.

Features, objects and advantages of the invention are in the description, drawings and claims.

DESCRIPTION OF DRAWINGS

Like reference symbols in the various drawings indicate like elements.

DETAILED DESCRIPTION

Figure 1:
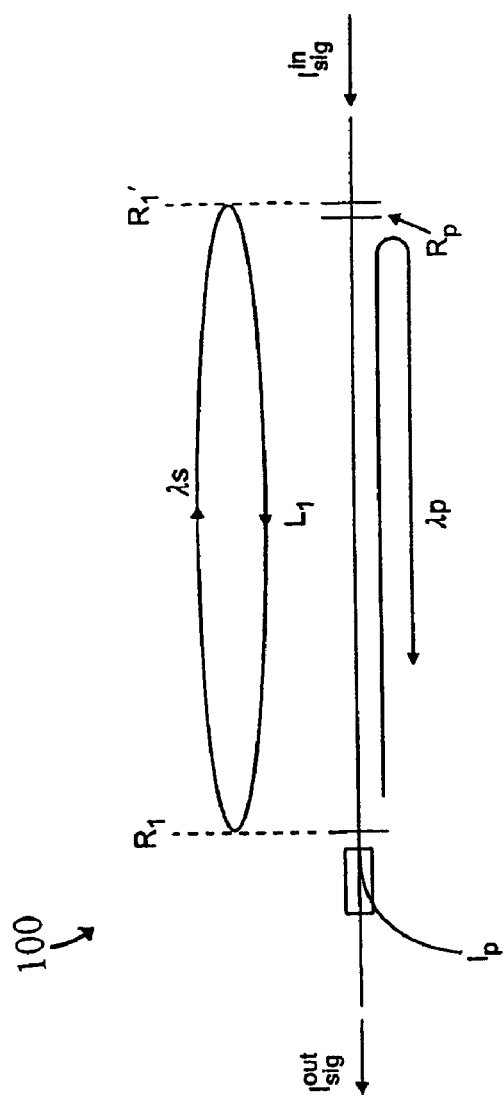
FIG. 1 is a schematic representation of an embodiment of a fiber amplifier system.

FIG. 1 illustrates a single cascade discrete Raman amplifier 100 (ignoring $I_{sig}^{in}$, $I_{sig}^{out}$) in accordance with the present invention. Raman amplifier 100 is formed by mirrors $R_1$, and $R_1'$, centered at the Stokes wave ($\lambda_s$) and is pumped by energy at pump wavelength $\lambda_p$. Without wishing to be bound by theory, it is believed that in general, the performance of Raman amplifier 100 can be described, at least in part, by the following system of nonlinear differential equations:

$$\frac{dI_p^+(z)}{dz} = -\frac{\lambda_s}{\lambda_p} g I_p^+(z)(I_s^+(z) + I_s^-(z)) - \alpha_p I_p^+(z) \quad (1)$$

$$\frac{dI_p^-(z)}{dz} = \frac{\lambda_s}{\lambda_p} g I_p^-(z)(I_s^+(z) + I_s^-(z)) + \alpha_p I_p^-(z)$$

$$\frac{dI_s^+(z)}{dz} = g(I_p^+(z) + I_p^-(z))I_s^+(z) - \alpha_s I_s^+(z)$$

$$\frac{dI_s^-(z)}{dz} = -g(I_p^+(z) + I_p^-(z))I_s^-(z) + \alpha_s I_s^-(z)$$

The indices + and − represent propagation in the fiber from left to right and from right to left, respectively. $I_p$ and $I_s$ represent the intensities of energy propagating the fiber at wavelengths $\lambda_p$ and $\lambda_s$, respectively. The Raman gain coefficient is g, and $\alpha_p$ and $\alpha_s$ are the loss coefficients of energy propagating in the fiber at wavelengths $\lambda_p$ and $\lambda_s$, respectively.

These equations can be solved analytically and the following formula obtained:

$$(I_s^+ + I_s^-) = \frac{\lambda_p}{\lambda_s} \left[ \frac{I_p}{\alpha_s L - \frac{1}{2}\ln(R_1 R_1')} - \frac{\alpha_p}{g} \right] \quad (2)$$

Here, $I_p$ is the power of the injected pump, and L is the length of the fiber. $R_1$ and $R_1'$ represent the reflectivities of the reflectors (e.g., fiber Bragg gratings) in FIG. 1. This formula can give us the magnitude of the total intensity of the Stokes wave in the cavity. Equation (2) is the basic equation that gives the total Stokes power at A, and contains all cavity parameters as well as pump power. As an example for amplification of a signal at 1550 nm, the wavelengths are 1366 nm and 1452 nm.

We now consider that there is a signal wave introduced in the cavity (see FIG. 1) with power $I_{sig}^{in}$ and the wavelengths shifted versus $\lambda_s$ by the Raman Stokes shift. During its propagation through the cavity, the signal wave will be amplified through the mechanism of stimulated Raman scattering, which can be described by the following expression:

$$\frac{dI_{sig}(y)}{dy} = (\tilde{g}(I_s^+ + I_s^-) - \alpha_{sig})I_{sig}(y), \quad y = -z \quad (3)$$

Here, $\tilde{g}$ is the Raman gain coefficient, and the system of coordinates is reversed (y=−z) for simplicity of calculation. The signal wave is considered weak enough not to deplete the Stokes wave. Equation (3) then has the following solution for the output signal:

$$I_{sig}^{out} = I_{sig}^{in} e^{(\tilde{g}(I_s^+ + I_s^-) - \alpha_{sig})L} \quad (4)$$

which gives us amplification in dB as follows:

$$K = \quad (5)$$

$$10\log\left(\frac{I_{sig}^{out}}{I_{sig}^{in}}\right) = 10\log(e)(\tilde{g}(I_s^+ + I_s^-) - \alpha_{sig})L = 4.3(\tilde{g}(I_s^+ + I_s^-) - \alpha_{sig})L$$

We can then substitute Equation (2) in Equation (5) and obtain:

$$K = 4.3\left(\tilde{g}\frac{\lambda_p}{\lambda_s}\left(\frac{I_p}{\alpha_s L - \frac{1}{2}\ln(R_1 R_1')} - \frac{\alpha_p}{g}\right) - \alpha_{sig}\right)L \quad (6)$$

If we consider a completely closed cavity (i.e. $R_1 = R_1' = 1$), then $$K = \quad (7)$$

$$4.3\left(\frac{\lambda_p}{\lambda_s}\left(\frac{\tilde{g}I_p}{\alpha_s} - \alpha_p \frac{\tilde{g}}{g}L\right) - \alpha_{sig}L\right) = 4.3\frac{\lambda_p}{\lambda_s}\left\{\frac{\tilde{g}I_p}{\alpha_s} - \left(\alpha_p \frac{\tilde{g}}{g} + \alpha_{sig}\frac{\lambda_s}{\lambda_p}\right)L\right\}$$

We can then roughly evaluate the pump power level required to achieve, for example, 10 dB gain in a 100 m cavity. The following values will be used:

$\lambda_p$=1345 nm
$\lambda_s$=1430 nm
g=0.006 1/m/W (highly $GeO_2$ doped fiber)
$\tilde{g}$=0.005 1/m/W
$\alpha_p$=0.00032 1/m
$\alpha_s$=0.00026 1/m
$\alpha_{sig}$=0.00025 1/m L=100 m
K=10 dB $$10 = 4.3 \frac{1345}{1430} \left\{ \frac{0.005 \cdot I_p}{0.00026} - \left( 0.00032 \frac{0.005}{0.006} + 0.00025 \frac{1430}{1345} \right) 100 \right\} =$$

$$4(19.2 \cdot I_p - 0.053)$$

Finally, $$I_p = \frac{2.5 + 0.053}{19.2} = 0.133 \text{ W} \qquad (9)$$

Thus, 133 mW power at 1345 nm pump will provide amplification of 10 dB for a signal wave at about 1526 nm wavelength in a 100 m long cavity.

In a closed cavity with high finesse, the intensity of the Stokes wave builds up to a very high magnitude, which allows one to obtain very efficient amplification of a signal wave.

The in-cavity intensity of the Stokes wave for the same parameters (see, e.g., Equation (2)) is:

$$(I_s^+ + I_s^-) = \frac{\lambda_p}{\lambda_s} \left( \frac{I_p}{\alpha_s L - \frac{1}{2} \ln(R_1 R_1')} - \frac{\alpha_p}{g} \right) = \qquad (10)$$

$$\frac{1345}{1430} \left( \frac{0.133 \text{ W}}{0.00026 \cdot 100} - \frac{0.00032}{0.006} \right) = 4.8 \text{ W}$$

In a cavity having the parameters defined in (8) and pumped by $I_p$=133 mW, the intensity of the Stokes wave is:

$$(I_s^+ + I_s^-) = 4.8 \text{ W} \qquad (11)$$

This result allows for the use of a single low power laser diode to obtain a high gain amplifier as shown in FIG. 1.

The current invention provides a highly efficient Raman amplifier suitable for a variety of applications. This invention further allows for a very simple, truly multiple wavelength, Raman amplifier because in this design one can isolate pieces of fiber for generation of individual Stokes waves $\lambda_{si}$, where i=1, 2, 3, . . . , using closed cavities, and generate a large number of these wavelengths using a relatively low pump power (1-2 W) at 13xx nm by sharing it between cavities. In this case, the intensities of individual Stokes waves can be easily and independently controlled by a power splitter. One example of such an amplifier 200 is shown in FIG. 2.

Figure 2:
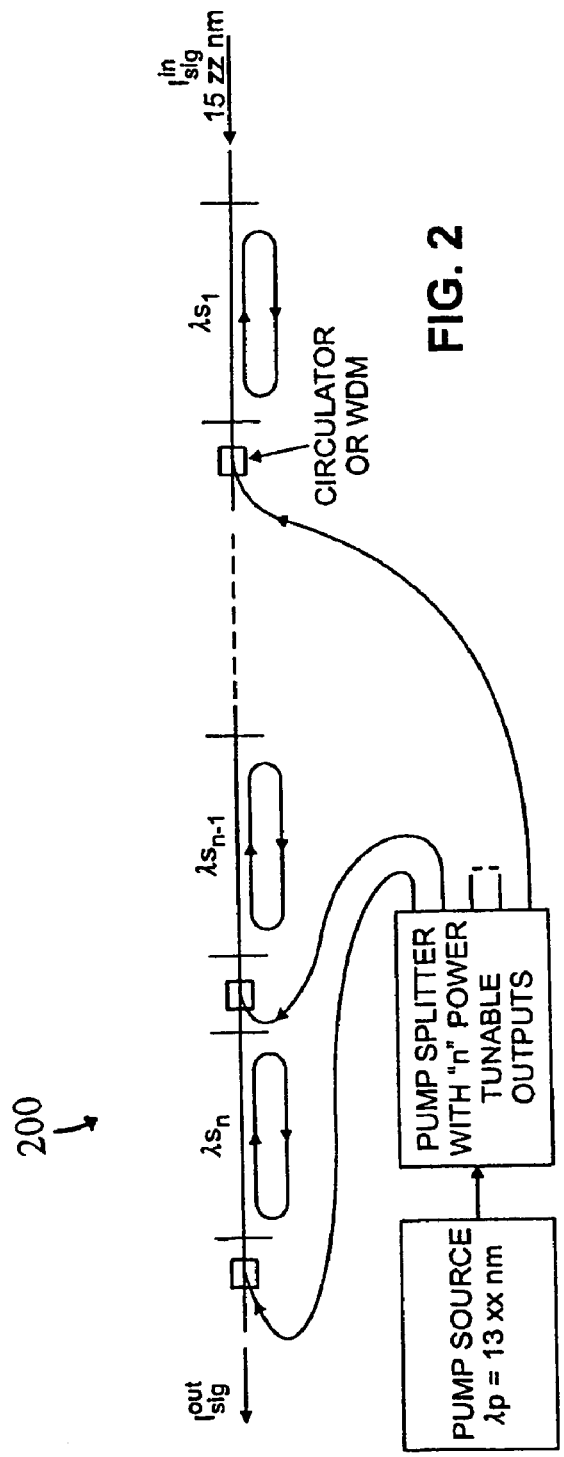
FIG. 2 is a schematic representation of another embodiment of a fiber amplifier system.

As shown in FIG. 2, instead of keeping all wavelengths ($\lambda_{si}$) together in the same lengths of fiber, they have been isolated from each other, thus reducing effects associated with their interaction. Further, the use of closed cavities allows the intensities of these waves to be kept constant along the lengths of the cavities. A further feature of the embodiment shown in FIG. 2 is that it works well with short cavities. For example, Equation (7) shows that there is no L dependence scaled with $I_p$, while losses decrease with the shortening of L.

Figure 3:
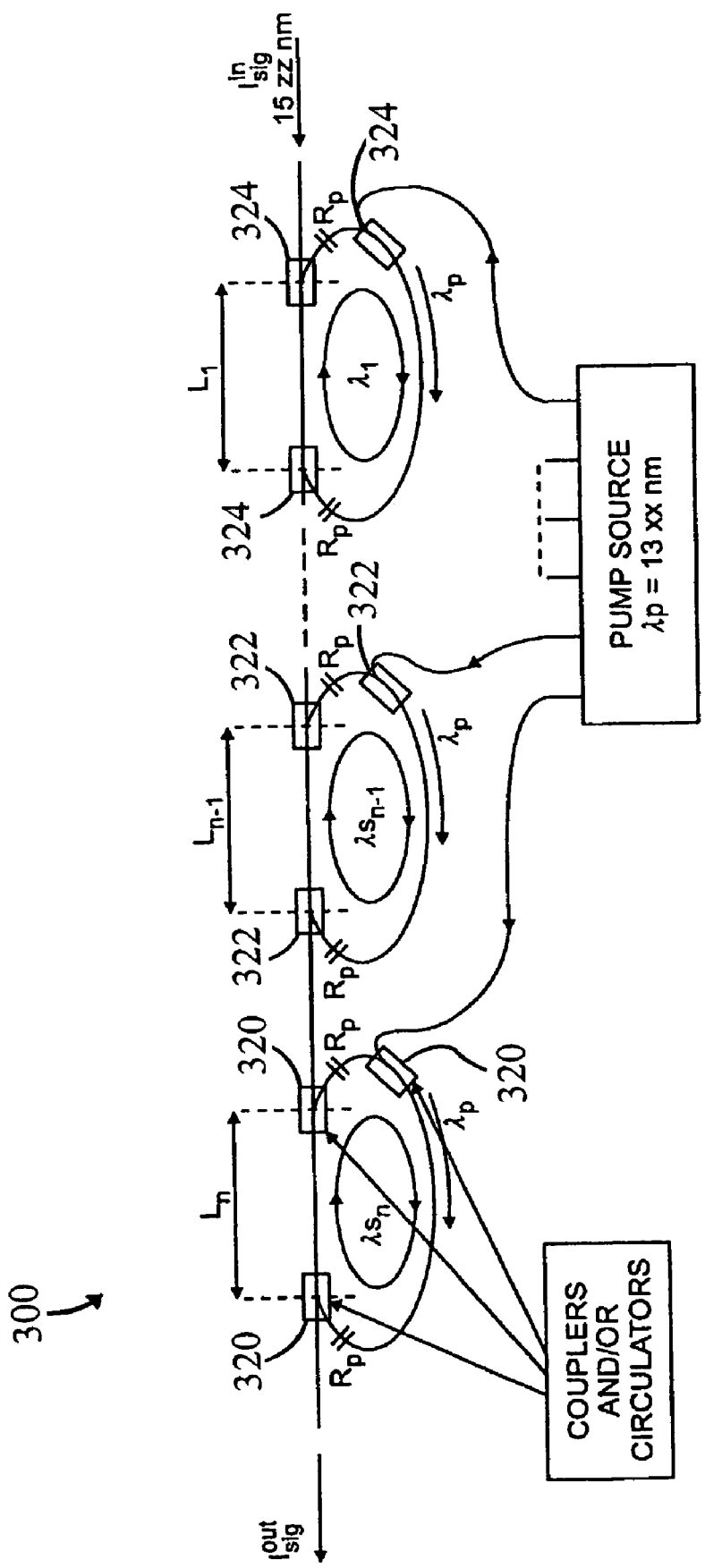
FIG. 3 is a schematic representation of another embodiment of a fiber amplifier system.

FIG. 3 shows another embodiment of an amplifier 300 in accordance with the present invention. The embodiment shown in FIG. 3 includes couplers 320, 322 and 324 (e.g., WDM couplers, circulators, etc.) that form ring cavities for generation of $\lambda_{si}$ (i=1, . . . , n) Stokes waves in the 14yy nm wavelength domain. All reflectors $R_p$ are highly reflective at the wavelength(s) of the master pump source (13xx nm).

WDM couplers and/or circulators placed in the length of principle fiber that guides the amplified signal are selected so that they are completely "transparent" for an amplified WDM signal, but able to keep waves $\lambda_i$ in the ring cavities. Amplification happens along the fiber lengths $L_1, L_2, \ldots, L_n$. The counter-propagation configuration of the presented amplifier reduces noise transfer from the pump to the amplified signal.

Figure 4:
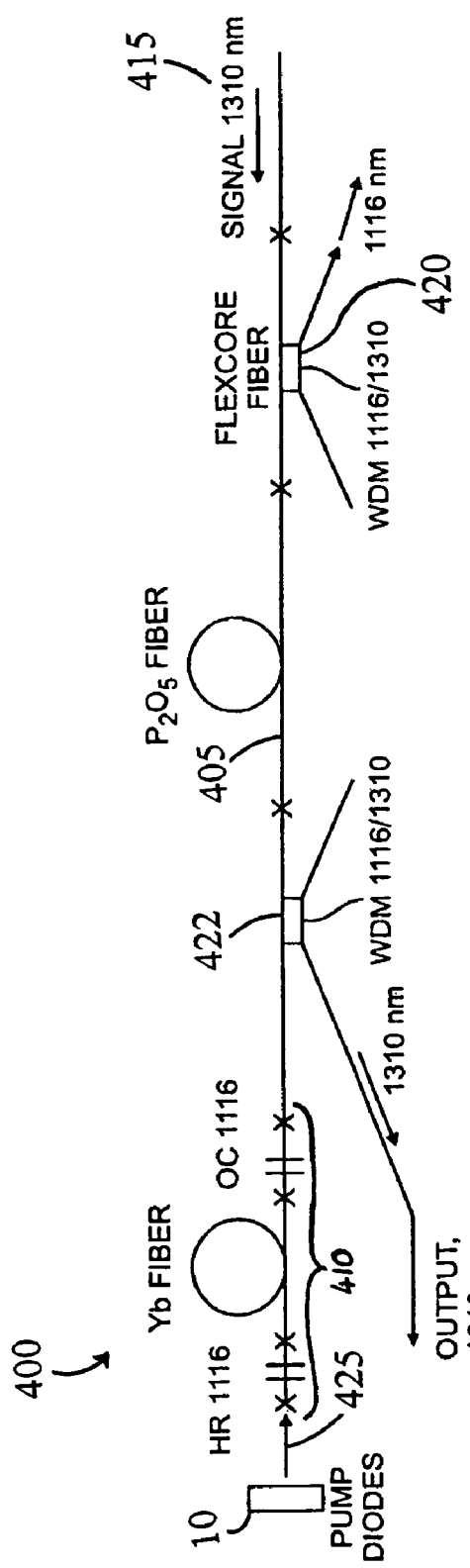
FIG. 4 is a schematic representation of another embodiment of a fiber amplifier system.

FIG. 4 shows a further embodiment of an amplifier 400 in accordance with the present invention. Amplifier 400 includes fiber laser 410 pumped by pump source 10. Pump source 10 can be one or more multi mode laser diodes. Fiber laser 410 is preferably doped with Yb. The output of fiber laser 410 is preferably at approximately 1116 nm. The output of fiber laser 410 is used to pump a length of optical fiber 405. Optical fiber 405 is preferably about 1-2 km in length and doped with phosphorous ($P_2O_5$). Optical fiber 405 has two couplers 420 and 422, to provide separation of the pump and signal waves. Couplers 420 and 422 are preferably WDM couplers at 1116 and 1310 nm respectively. As shown in FIG. 4, signal 415 enters amplifier 400 from the right side, while pump wave 425 enters amplifier 400 from the left side, resulting in a counter-propagating amplification scheme. Other propagation schemes may be used (e.g. co-propagating amplification, etc.).

In the embodiment shown in FIG. 4, amplification occurs in optical fiber 405 according to the principle of stimulated Raman amplification. If optical fiber 405 is doped with $P_2O_5$ rather than $GeO_2$, a larger Stokes shift can be obtained (e.g., approximately 1330 $cm^{-1}$ as compared with 420-440 $cm^{-1}$). This large Stokes shift allows for the use of the output from fiber laser 410 to directly pump optical fiber 405 to produce a simple, low cost optical amplifier at 1310 nm.

Figure 5:
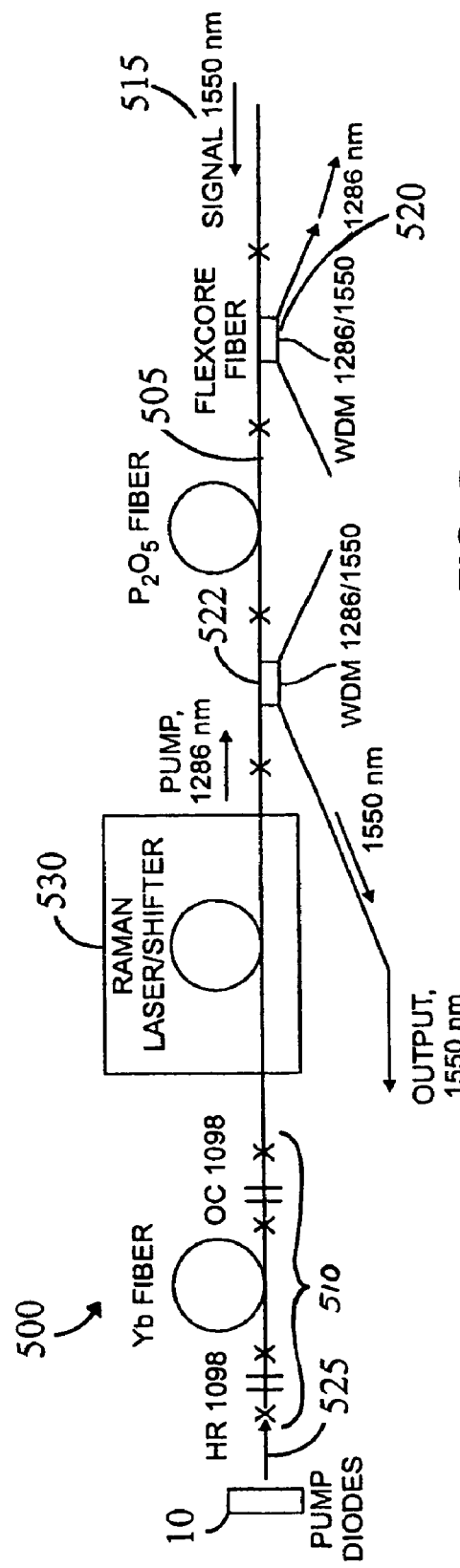
FIG. 5 is a schematic representation of another embodiment of a fiber amplifier system.

FIG. 5 shows a further embodiment of an amplifier 500 in accordance with the present invention. Amplifier 500 includes fiber laser 510 pumped by pump source 10. Pump source 10 can be one or more multimode laser diodes. Fiber laser 510 is preferably doped with Yb. The output of fiber laser 510 is preferably downshifted to approximately 1286 nm. This output can be obtained through wavelength conversion (e.g., by using a multistage $GeO_2/SiO_2$ based Raman laser (shifter), single stage $P_2O_5$ based Raman laser (shifter), etc.). Shifters are described, for example, in commonly owned U.S. Provisional Patent Application Ser. 60/302,603, filed on Jul. 2, 2001, and entitled "Multi-Wavelength Optical Fiber", which is hereby incorporated by reference.

Referring again to FIG. 5, the output of shifter 530 is used to pump a length of optical fiber 505. Optical fiber 505 is preferably about 1-2 km in length and doped with phosphorous ($P_2O_5$). Optical fiber 505 has two couplers 520 and 522, to provide separation of the pump and signal waves. Couplers 520 and 522 are preferably WDM couplers at 1286 and 1550 nm respectively. As shown in FIG. 5, signal 515 enters amplifier 500 from the right side, while pump wave 525 enters amplifier 500 from the left side, resulting in a counter-propagating amplification scheme. Other propagation schemes may be used (e.g. co-propagating amplification, etc.).

In the embodiment shown in FIG. 5, amplification occurs in optical fiber 505 according to the well-known principle of stimulated Raman amplification. If optical fiber 505 is doped with $P_2O_5$ rather than $GeO_2$, a larger Stokes shift can be obtained (e.g., approximately 1330 $cm^{-1}$ as compared with 420-440 $cm^{-1}$).

While the foregoing description has been made for a system in which the reflectance of a reflector is fixed. In some embodiments, the reflectance of a reflector can be variable. Various combinations of tunable reflectors are contemplated. Furthermore, these systems can include, for example, appropriate electronics to form a feedback loop so that the systems can monitor the intensity of energy output at one or more wavelengths and vary the reflectance of one or more reflectors (e.g., vary the reflectance of one or more reflectors in real time) to obtain one or more desired output intensities at one or more wavelengths. In certain embodiments, a reflector can be formed of a variable output coupler. Such couplers are described, for example, in commonly owned U.S. Provisional Patent Application Ser. 60/300,298, filed on Jun. 22, 2001, and entitled "Variable Spectrally Selective Output Coupler For Fiber Laser", which is hereby incorporated by reference.

While certain embodiments have been described, the invention is not limited to these embodiments. For example, the reflectors need not be in the form of fiber Bragg gratings. One or more of the reflectors can be a loop mirror, or one or more reflectors can be in the form of a coated mirror (e.g., a coated mirror at one or both ends of a section of optical fiber), etc. As an additional example, the type of laser used for pumping can be varied. Examples of lasers that can be used include semiconductor diode lasers (e.g., high power semiconductor diode lasers), double clad doped fiber lasers, conventional free space coupled lasers, and the like. As another example, various types of optical fibers can be used, including, for example, double clad optical fibers and polarization maintaining optical fibers. Furthermore, the optical fibers can be formed of, for example, silica based materials (e.g., fused silica based) or fluoride based materials. As yet another example, the relative and/or absolute lengths of one or more of the sections of the optical fiber can be varied based upon the intended use of the Raman fiber amplifier.

Figure 6:
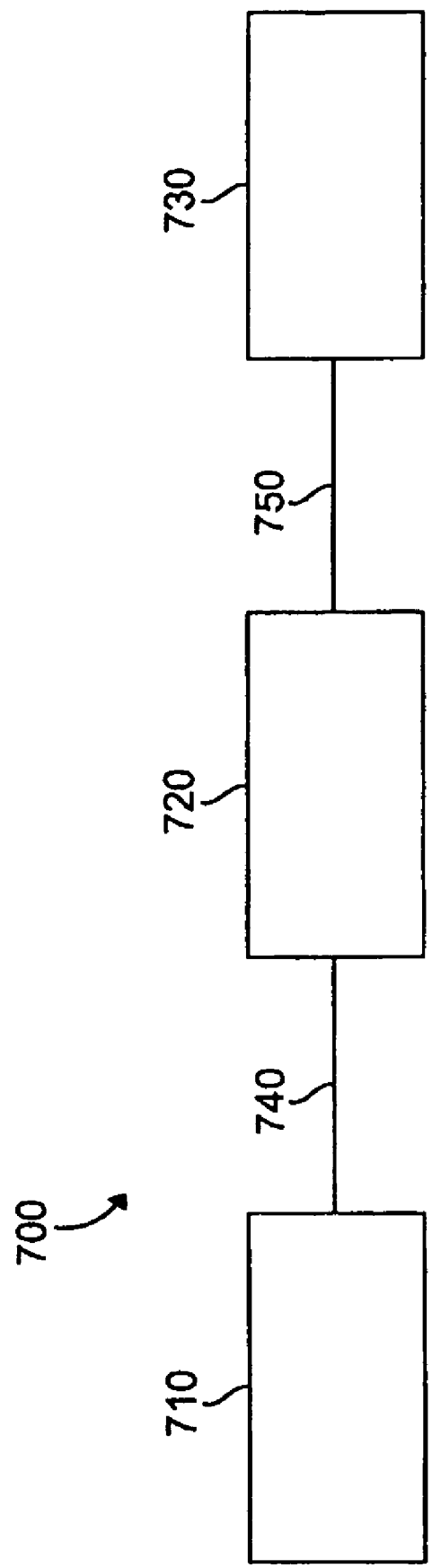
FIG. 6 is a schematic representation of a system including a fiber amplifier.

The foregoing fiber amplifiers can be used in a variety of situations. FIG. 6 is a schematic representation of a system 700 including a transmitter 710, an amplifier (e.g., one of the above-described amplifiers) 720 and a detector 730. Transmitter 710 and amplifier 720 are in optical communication via optical conduit (e.g., optical fiber) 740, and amplifier 720 and detector 730 are in optical communication via optical conduit (e.g., optical fiber) 750.

Other embodiments are in the claims.

What is claimed is:

1. A fiber amplifier for amplifying an optical signal, comprising:
    a pump energy source configured to emit energy at a pump wavelength; an optical apparatus for transmitting the optical signal, the optical apparatus having a plurality of discrete portions, each discrete portion comprising a length of optical fiber and first and second components disposed at first and second respective locations and configured to substantially prevent energy having an intermediate wavelength in the discrete portion from entering another of the discrete portions of the optical apparatus;
    a plurality of waveguides, each waveguide coupled to the pump energy source and to one of the plurality of discrete portions of the optical apparatus, each waveguide configured to provide energy at the pump wavelength from the pump energy source to its corresponding discrete portion, thereby increasing an intensity of light at the discrete portion's intermediate wavelength in the corresponding discrete portion of the optical apparatus;
    wherein the intermediate wavelength of a first of the discrete portions is different than the intermediate wavelength of a second of the discrete portions; and
    wherein the pump energy source comprises a splitter configured to couple pump energy into the plurality of waveguides.

2. The fiber amplifier of claim 1, wherein the intermediate wavelength of each of the plurality of discrete portions is equal to the pump energy wavelength Stokes shifted one or more times.

3. The fiber amplifier of claim 1, wherein for at least one of the discrete portions the first and second components comprise reflectors configured to reflect substantially all energy impinging thereon at the discrete portions intermediate wavelength and to transmit substantially all energy at the signal wavelength.

4. The fiber amplifier of claim 3, wherein The reflectors comprise fiber Bragg gratings.

5. The fiber amplifier of claim 1, further comprising a pump beam coupler attached to at least one discrete portion and to one of the plurality of waveguides, the pump beam coupler being configured to couple energy at the pump wavelength from the one of the plurality of waveguides into the at least one discrete portion.

6. The fiber amplifier of claim 5, wherein the at least one discrete portion includes a pump energy reflector configured to reflect substantially all energy impinging thereon at the pump wavelength 7. The fiber amplifier of claim 1, further comprising a cavity fiber having first and second ends respectively attached In the first and second components of one of the discrete portions.

8. The fiber amplifier of claim 1, wherein for at least one of the discrete portions the first component comprises a first coupler configured to couple energy having the discrete portion's intermediate wavelength into the discrete portion's length of optical fiber.

9. The fiber amplifier of claim 8, wherein for the at least one of the discrete portions the second component comprises a second coupler configured to couple light having the discrete portion's intermediate wavelength out of the discrete portion's length of optical fiber.

10. The fiber amplifier of claim 9, wherein the first and second couplers each comprise a wavelength division multiplexer.

11. The fiber amplifier of claim 9, wherein the first and second couplers each comprise a circulator.

12. The fiber amplifier of claim 1, wherein at least one of the discrete portions further comprises a cavity fiber having first and second ends respectively attached to the first and second components of the at least one discrete portion.

13. The fiber amplifier of claim 12, wherein the at least one discrete portion defines a ring cavity for energy having the discrete portions intermediate wavelength.

14. A fiber amplifier for amplifying an optical signal, comprising:
    a pump energy source configured to emit energy at a pump wavelength; an optical apparatus for transmitting the optical signal, the optical apparatus having a plurality of discrete portions, each discrete portion comprising a length of optical fiber and first and second components disposed at first and second respective locations and configured to substantially prevent energy having an intermediate wavelength in the discrete portion from entering another of the discrete portions of the optical apparatus;
    a plurality of waveguides, each waveguide coupled to the pump energy source and to one of the plurality of discrete portions of the optical apparatus, each waveguide configured to provide energy at the pump wavelength from the pump energy source to its corresponding discrete portion, thereby increasing an intensity of light at the discrete portion's intermediate wavelength in the corresponding discrete portion of the optical apparatus;

wherein the intermediate wavelength of a first of the discrete portions is different than the intermediate wavelength of a second of the discrete portions;

wherein at least one of the discrete portions further comprises a cavity fiber having first and second ends respectively attached to the first and second components of at least one discrete portion;

wherein at least one discrete portion defines a ring cavity for energy having the discrete portion's intermediate wavelength; and wherein the first component comprises a first coupler configured to couple energy having the discrete portion's intermediate wavelength out of the cavity fiber into the at least one discrete portion's length of optical fiber and the second component comprises a second coupler configured to couple energy having the discrete portion's wavelength out of the at least one discrete portion's length of optical fiber and into the cavity fiber.

15. A fiber amplifier for amplifying an optical signal, comprising:

a pump energy source configured to emit energy at a pump wavelength; an optical apparatus for transmitting the optical signal, the optical apparatus having a plurality of discrete portions, each discrete portion comprising a length of optical fiber and first and second components disposed at first and second respective locations and configured to substantially prevent energy having an intermediate wavelength in the discrete portion from entering another of the discrete portions of the optical apparatus;

a plurality of waveguides, each waveguide coupled to the pump energy source and to one of the plurality of discrete portions of the optical apparatus, each waveguide configured to provide energy at the pump wavelength from the pump energy source to its corresponding discrete portion, thereby increasing an intensity of light at the discrete portion's intermediate wavelength in the corresponding discrete portion of the optical apparatus;

wherein the intermediate wavelength of a first of the discrete portions is different than the intermediate wavelength of a second of the discrete portions;

wherein at least one of the discrete portions further comprises a cavity fiber having first and second ends respectively attached to the first and second components of the at least one discrete portion; and wherein the fiber amplifier further comprises first and second reflectors disposed in the cavity fiber and configured to reflect substantially all energy impinging thereon at the pump wavelength.

16. The fiber amplifier of claim 5, further comprising a waveguide coupler attached to the cavity fiber and to one of the plurality of waveguides, the waveguide coupler being configured to couple energy having the pump wavelength from the waveguide into the cavity fiber.

17. The fiber amplifier of claim 16, wherein the waveguide coupler is located between the first reflector and the second reflector disposed in the cavity waveguide.

18. The fiber amplifier of claim 12, wherein the cavity fiber has a gain medium comprising an active material, said active material comprising at least one of $GeO_2$ and $P_2O_5$.

19. The fiber amplifier of claim 18, wherein the active material is $GeO_2$.

20. The fiber amplifier of claim 18, wherein the active material is $P_2O_5$.

21. The fiber amplifier of claim 1, wherein the optical fiber apparatus has a gain medium comprising an active material, said active material comprising at least one of $GeO_2$ and $P_2O_5$.

22. The fiber amplifier of claim 21, wherein the active material is $GeO_2$.

23. The fiber amplifier of claim 21, wherein the active material is $P_2O_5$.

24. The fiber amplifier of claim 1, wherein the splitter is configured to variably couple pump energy into the plurality of waveguides.

25. The fiber amplifier of claim 1, wherein the pump energy source comprises a laser.

26. The fiber amplifier of claim 1, wherein the pump energy source comprises a plurality of lasers.

27. The fiber amplifier of claim 26, wherein each of the plurality of lasers corresponds to one of the discrete portions of the optical fiber.

28. The fiber amplifier of claim 1, wherein the pump energy source comprises a laser diode.

29. The fiber amplifier of claim 1, wherein the pump energy source has a power of less than 5 W.

30. The fiber amplifier of claim 1, wherein the pump energy source has a power of less than 2 W.

31. The fiber amplifier of claim 1, wherein the pump energy source has a power of less than 1 W.

32. The fiber amplifier of claim 1, wherein the pump energy wavelength is between 1300 nm and 1400 nm.

33. The fiber amplifier of claim 1, wherein at least one of the discrete portion's intermediate wavelength is between 1400 nm and 1500 nm.

34. The fiber amplifier of claim 1, wherein the signal wavelength is between 1500 nm and 1600 nm.

35. A fiber amplifier for amplifying an optical signal having a signal wavelength, comprising:

optical apparatus having a plurality of discrete portions; each discrete portion comprising:

a length of optical fiber;

first and second components positioned at first and second respective locations in the discrete portion and configured to substantially prevent light having an intermediate wavelength in the discrete portion from entering another discrete portion of the optical fiber;

a coupler configured to couple pump energy from a pump energy source into the discrete portion so that the pump energy interacts with the length of optical fiber to increase the intensity of the intermediate wavelength in each portion; and wherein the intermediate wavelength of a first of the discrete portions is different than the intermediate wavelength of a second of the discrete portions.

36. The fiber amplifier of claim 35, wherein for at least one of the discrete portions the first and second components comprise reflectors configured to reflect substantially all energy impinging thereon at the discrete portion's intermediate wavelength and to transmit substantially all energy at the signal wavelength.

37. The fiber amplifier of claim 35, wherein at least one discrete portion includes a pump energy reflector configured to reflect substantially all energy impinging thereon at the pump wavelength.

38. The fiber amplifier of claim 35, further comprising a cavity fiber having first and second ends respectively attached to the first and second components of one of the discrete portions.

39. The fiber amplifier of claim 38, wherein the at least one discrete portion defines a ring cavity for energy having the discrete portion's intermediate wavelength.

40. The fiber amplifier of claim 39, wherein the first coupler is configured to couple energy having the discrete poilion's intermediate wavelength out of the cavity fiber into the length of fiber of the at least one discrete portion and the second coupler is configured to couple energy having the discrete portion's wavelength out of the length of fiber of the at least one discrete portion and into the cavity fiber.

41. A fiber amplifier, comprising:
an optical fiber having first and second sections coupled to each other,
wherein the first section is a double clad fiber laser, and the second section is an optical amplifier having a gain medium including $P_2O_5$.

42. The fiber amplifier of claim 41, wherein during operation the fiber amplifier amplifies energy propagating in the second section of the optical fiber having a signal wavelength between 1,300 nm and 1,400 nm 43. The fiber amplifier of claim 41, further comprising a pump energy source configured to pump the first section of the optical fiber.

44. The fiber amplifier of claim 43, wherein the pump energy source comprises a pump diode.

45. The fiber amplifier of claim 41, further comprising a first coupler disposed in the second section and configured to couple energy having a signal wavelength out of the optical fiber.

46. The fiber amplifier of claim 45, further comprising a second coupler disposed in the second section and configured to couple energy at a first wavelength out of the optical fiber.

47. The fiber amplifier of claim 46, wherein the first wavelength is related to the signal wavelength by a Stokes shift of more than $1,000$ $cm^{-1}$.

48. A fiber amplifier for amplifying an optical signal, comprising: a pump energy source configured to emit pump energy; a plurality of closed cavities, each cavity having a different intermediate wavelength and comprising optical fiber configured to amplify the optical signal, the plurality of closed cavities being configured to substantially prevent energy having the intermediate wavelength from one of the closed cavities from entering another of the closed cavities; and
a plurality of waveguides, each waveguide coupled to the pump energy source and to one of the plurality of closed cavities, each waveguide configured to provide pump energy from the pump energy source to its corresponding closed cavity, thereby increasing an intensity of light at the closed cavity's intermediate wavelength in the corresponding closed cavity.

49. The fiber amplifier of claim 48, wherein the intermediate wavelength of each of a plurality of the closed cavities is equal to the pump energy wavelength Stokes shifted one or more limes.

50. The fiber amplifier of claim 48, wherein at least one of the closed cavities comprises first and second reflectors configured to reflect substantially all energy impinging thereon at the closed cavity's intermediate wavelength and to transmit substantially all energy at the signal wavelength.

51. The fiber amplifier of claim 48, wherein the reflectors comprise fiber Bragg gratings.

52. The fiber amplifier of claim 48, wherein at least one closed cavity comprises a pump energy reflector configured to reflect substantially all energy impinging thereon at the pump wavelength.

53. The fiber amplifier of claim 48, comprising a splitter configured to couple pump energy into the plurality of waveguides.

54. The fiber amplifier of claim 48, wherein the pump energy source has a power of less than 5 W.

55. The fiber amplifier of claim 48, wherein the pump energy source has a power of less than 2 W.

56. The fiber amplifier of claim 48, wherein the pump energy source has a power of less than 1 W.

* * * * *